(12) United States Patent
Zauritz et al.

(10) Patent No.: US 7,556,288 B2
(45) Date of Patent: Jul. 7, 2009

(54) SIDE AIR BAG WITH A CONTROLLED OPENING OF A PRESSURE EQUALIZATION CHAMBER

(75) Inventors: Ralf Zauritz, Holzkirchen (DE); Thomas Isensee, Dachau (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/836,586

(22) Filed: Aug. 9, 2007

(65) Prior Publication Data

US 2008/0012274 A1 Jan. 17, 2008

Related U.S. Application Data

(63) Continuation of application No. PCT/EP2006/000938, filed on Feb. 3, 2006.

(30) Foreign Application Priority Data

Feb. 10, 2005 (DE) ........................ 10 2005 005 964

(51) Int. Cl.
*B60R 21/213* (2006.01)
*B60R 21/233* (2006.01)
(52) U.S. Cl. ..................... 280/730.2; 280/729
(58) Field of Classification Search .............. 280/730.2, 280/729
See application file for complete search history.

(56) References Cited

U.S. PATENT DOCUMENTS

| 6,135,493 | A | * | 10/2000 | Jost et al. ................. 280/730.2 |
| 6,170,869 | B1 | | 1/2001 | Tomiyama |
| 6,431,589 | B1 | * | 8/2002 | Heigl et al. ............... 280/730.2 |
| 6,457,742 | B1 | * | 10/2002 | Brucker .................... 280/730.2 |
| 2001/0026062 | A1 | * | 10/2001 | Kosugi et al. ............. 280/730.2 |
| 2003/0057683 | A1 | | 3/2003 | Wipasuramonton et al. |
| 2003/0230876 | A1 | * | 12/2003 | Ohrvall et al. ........... 280/730.2 |
| 2004/0056456 | A1 | * | 3/2004 | Ikeda et al. ............... 280/730.2 |
| 2005/0057025 | A1 | * | 3/2005 | Hofmann ................. 280/730.2 |
| 2005/0062268 | A1 | * | 3/2005 | Inoue et al. .............. 280/730.2 |

FOREIGN PATENT DOCUMENTS

JP 2003-320920 * 11/2003
WO WO 02/055337 7/2002

* cited by examiner

*Primary Examiner*—Ruth Ilan
(74) *Attorney, Agent, or Firm*—Brinks Hofer Gilson & Lione

(57) ABSTRACT

A side-impact air bag system for motor vehicles with an air bag (10) extending across at least a part of the longitudinal extent of the vehicle. The air bag (10) is formed by two layers of fabric which are joined to each other and is located in the region of the roof frame of the vehicle in its folded state, before it is unfolded in the form of a curtain. An inflation device (11) releases an inflating gas, and the air bag (10) contains at least one primary chamber (14) which can be inflated by directly feeding gas into it, as well as at least one additional pressure equalization chamber (16), which is separated from the immediately inflatable primary chamber (14). The pressure equalization chamber (16) is equipped across its surface with additionally placed connections (19) of the fabric layers of the air bag (10) in such a manner that the gas stream entering the pressure equalization chamber (16) after inflation of the directly inflatable primary chamber (14) as a function of the pressure acting upon it, inflates portions of the pressure equalization chamber (16) by separation of the additional connections (19).

2 Claims, 3 Drawing Sheets

SIDE AIR BAG WITH A CONTROLLED OPENING OF A PRESSURE EQUALIZATION CHAMBER

CROSS REFERENCE TO RELATED APPLICATION

This application claims priority to PCT/EP2006/000938, filed Feb. 3, 2006.

FIELD OF THE INVENTION

The invention concerns a side-impact occupant protection system for motor vehicles with an air bag extending across at least a part of the longitudinal extent of the vehicle, in which the air bag, which is formed by two layers of fabric, which are joined to each other, is located in the region of the roof frame of the vehicle in a folded-up condition. The air bag unfolds in the form of a curtain and is connected to an inflation device which releases an inflation gas. The air bag contains at least one primary chamber, which can be inflated by directly feeding gas into it, as well as at least one additional pressure equalization chamber, which is separated from the immediately inflatable primary chamber.

BACKGROUND OF THE INVENTION

A side-impact protective system with the above-mentioned general characteristics is described in U.S. Pat. No. 6,170,860 B1. In the case of the gas bag described therein, there are several pressure equalization regions in the form of pressure equalization chambers in addition to the main chambers, which can be directly inflated by the gas stream, which is released during the actuation, and which pressure equalization chambers are separated from the directly inflatable chambers by linear seals, and which, therefore, are initially not inflated when the side-impact protective system is triggered. These additional chambers have the function of ventilating the chamber after they had been inflated immediately upon actuation when an impact by the occupants of the vehicle occurred, by causing the seals to be opened as a result of the higher interior pressure produced by the impact, so that the inflation gas can pass from the immediately inflated chambers into the pressure equalization chambers. By this means, on the one hand, the desired flexibility of the initially inflated chambers, which are stressed by the impact of the occupants, is achieved, and, on the other hand, the gas which has been displaced from the initially inflated chambers remains inside the air bag, and thus provides a longer period of time during which the air bag can absorb impact energy, especially in the case of multiple impacts or in the case of an accident where the vehicle is overturned.

In the embodiment known from U.S. Pat. No. 6,170,860 B1, the pressure equalization chambers have a circumferential gas-tight seal around them, while throttled transition points have been placed in the seals for the gas that needs to be displaced from the initially inflated chambers as the interior pressure rises. While these throttled transition points permit the transfer of gas from the initially inflated chambers to the pressure equalization chambers, there is, however, still the disadvantage that a control of the gas transfer as a function of the interior pressure, which is built up during the impact of the occupants, is not possible in the initially inflated chambers.

SUMMARY OF THE INVENTION

This invention is, therefore, based on the objective of further developing a side-impact protection system, having the generic characteristics in such a manner, that by simple means a pressure equalization is provided as a function of the severity of the impact of the occupants between the initially inflated primary chamber and the pressure equalization chamber.

The solution to this problem, including advantageous embodiments and further developments of the invention, arises from the content of the patent claims, which follow this description.

In its basic concept, the present invention provides at least the one pressure equalization chamber equipped across its surface with additionally provided connections of the fabric layers of the air bag in such a manner, that the gas stream entering the pressure equalization chamber after the inflation of the immediately inflatable primary chamber inflates portions of the pressure equalization chamber as a function of the applied pressure by separation of the additional connections. The invention has the advantage that at least the one pressure equalization chamber automatically provides an adapted volume as a function of the pressure conditions being generated in the air bag, which volume is filled by the displaced gas. It is thus possible to limit the elasticity of the primary chambers, which are stressed by the impact of the occupants, to the desired degree, without complicated controls with additional control means for the adjustment of the gas transfer into the pressure equalization chamber being required.

According to an example of an embodiment of the invention, the connections of the fabric layers of the gas bag are arranged in a grid containing points placed at a distance to each other. In this example of an embodiment, the gas moving into the pressure equalization chamber can initially fill the spaces between the individual point-shaped connections; to the extent that this is not enough, the correspondingly increasing interior pressure leads to a demand-driven failure of the connections, so that increasingly an inflation volume in the pressure equalization chamber is made available. In the process, by means of the layout of the grid of the connecting points, the possibility exists to define the gas flow that needs to be initiated without an initial breaking of the connection points.

Alternatively, it can be seen to it that the fabric layers of the gas bag are connected to each other over the entire surface of the pressure equalization chamber; by doing this, the separation of the two air bag layers occurs as a function of the prevailing interior pressure to the desired degree, so that an appropriate inflation volume is made available.

According to examples of embodiments of the invention, the connections can be either made by gluing the two fabric layers to each other, in a manner known as such, or, however, by partially interweaving the fabric layers with each other (the so-called OPW-technique) or alternatively also by sewing the two fabric layers to each other.

According to an example of an embodiment of the invention, it can be provided that the pressure equalization chamber is separated from the immediately inflatable primary chamber by a seal, which can be opened at a pre-established interior pressure in the immediately inflatable chamber, which seal connects the fabric layers of the gas bag to each other, as is known in principle from the U.S. Pat. No. 6,170,860 B1 with regard to the pressure equalization chambers provided there. By this means, in a first embodiment of the invention, it can be seen to it that a circumferential seal enclosing the pressure equalization chamber is provided.

In order to establish the initial pressure for the transfer of gas from the initially inflated chamber into the pressure equalization chamber, a seal is placed between the directly inflatable primary chamber and the pressure equalization chamber and at least one openable through-opening for the gas is provided. The through-opening according to examples of embodiments of the invention can be closed by an inflation control seam or once again by a partial interweaving of the two fabric layers of the air bag.

In an alternate embodiment of the invention it can be provided that the seal encloses the pressure equalization chamber over a portion of its circumference, so that a separate through-opening can be dispensed with. Rather, the gas can flow from the immediately inflatable primary chamber into the pressure equalization chamber.

According to one example of an embodiment of the invention, it can be provided that the seal is constructed in the form of an adhesive joint of the two fabric layers of the air bag or by a partial interweaving of the fabric layers, as mentioned before.

It is, however, likewise possible and provided in accordance with an example of an embodiment of this invention, that the seal is formed by a tight grid of the additional connections; in this embodiment the provision of a separate seal is dispensed with. Nevertheless, a higher pressure for the entry of the gas into the equalized-pressure chamber can, however, be set, because it is required for the subsequent opening of at least portions of the pressure equalization chamber by means of the separation of the additional connections.

BRIEF DESCRIPTION OF THE DRAWINGS

In the drawing, examples of embodiments of the invention are shown, which are described below. The following is shown.

DETAILED DESCRIPTION OF THE INVENTION

Figure 1:
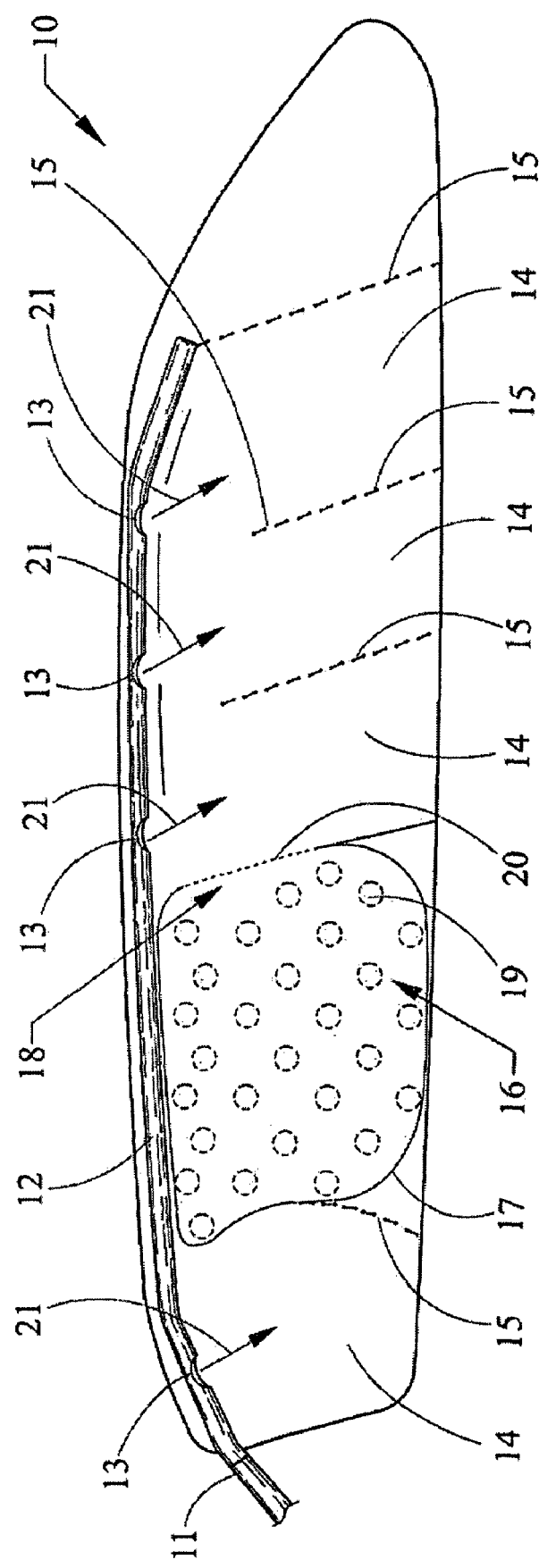
FIG. 1 illustrates an air bag unfolded in the form of a curtain in a schematic side view according to the present invention.

The air bag 10 shown in FIG. 1 has an overall elongated form, with the air bag 10 in the unfolded condition shown is, for example, stretched out between the A-pillar and the C-pillar of a motor vehicle, so as to cover the side windows of the vehicle to provide head protection against a lateral impact. Insofar as the air bag 10 is placed in the roof frame of the motor vehicle in the folded-up state before it is triggered, an inflatable tube 12 is located in this region at the upper edge of the air bag 10, which tube is connected at its back end to a gas generator 11, which is located in the motor vehicle.

According to the desired protective effect, the air bag 10 is subdivided into several primary chambers 14 by several subdivisions 15, which can, for example, be constructed as strong sewed seams, in the process of which the individual primary chambers 14 are each provided with openings 13 in the inflation tube 12, so that, when the gas generator 11 is triggered, these chambers 14 are immediately inflated by the inflow of gas. In the example of the embodiment shown in FIG. 1, there are three chambers 14 in the approximate region of the first side window, which is located in the front side door of the vehicle, while in the rear region still another inflatable primary chamber 14 is located. Between the inflatable primary chamber 14 there is a pressure equalization chamber 16, which is separated from the inflatable chambers by a circumferential seal 17, which region, because of the seal 17, provides pressure equalization, and is therefore not likewise inflated when gas is initially fed into the air bag 10 by way of the openings 13. This pressure equalization chamber 16 can, for example, be located in the region of the B-pillar of the motor vehicle.

The seal 17 contains a through-opening 18 as a connection to one of the primary chambers 14, which at first, for example, is shut by an inflation control seam 20. In addition, the two fabric layers of the air bag 10 are connected to each other at individual connection points 19, which are distributed across the surface of the pressure equalization chamber 16, are, for example, connected by means of a suitable adhesive, for example, silicon, or by partial interweaving of the two fabric layers, which is known as the so-called OPW-technique. In any event, it must be seen to it that when an appropriate stress occurs as a result of the interior pressure arising in the pressure-equalization chamber 16, the two fabric layers of the air bag 10 at the connection points 19 can separate from each other.

After the gas generator 11 is triggered, the gas, which is now generated, flows through the inflation tube 12 and by way of the gas exit openings 13 into the individual primary chambers 14, which is indicated by means of the flow arrows 21. Because the through-opening 18 of the pressure equalization chamber 16 in the seal 17 is at first, for example, closed by means of the inflation control seam 20, the pressure equalization chamber 16 is not initially inflated.

If within the framework of an accident an impact of the occupant of the vehicle against the inflated primary chambers 14 occurs, then the interior pressure present in the chambers 14 is increased; if this increase in pressure exceeds a predetermined level, then the inflation control seam 20 at the through-opening 18 is torn open, and providing pressure equalization gas now flows from the chambers 14 into the pressure equalization chamber 16, in the process of which at first the surfaces left free between the connection points 19 of the pressure equalization chamber 16 are filled and are correspondingly inflated. With a further increase of the interior pressure, the connecting points 19 may also be torn open depending on pressure conditions, and thus make an additional inflation volume available in the pressure equalization chamber 16. In practice, it has been shown that in order to open the inflation control seam 20 which closes the through-opening 18, an interior pressure in the immediately inflated primary chamber 14 is required, which is approximately twice as high as a suitable or sufficient interior pressure, as the case may be, in the pressure equalization chamber 16, in order to open the additional connections 19.

Figure 2:
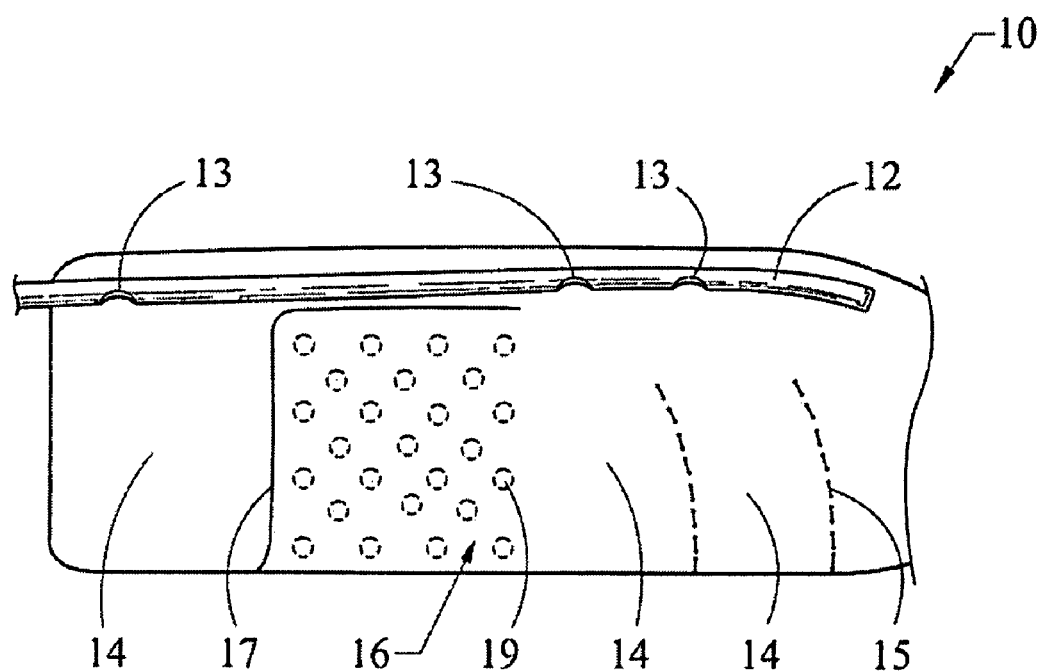
FIGS. 2 through 4 illustrate further examples of embodiments of the present invention.

The example of an embodiment shown in FIG. 2 is different from the example of an embodiment described above, in that the seal 17 does not completely enclose the pressure equalization chamber 16 with the additional connections 19 located in it, but does so only over a portion of its circumference. Thus the inflation gas can enter from the initially inflated primary chambers 14 directly into the pressure equalization chamber 16, which to as yet does not form a closed chamber.

Figure 3:
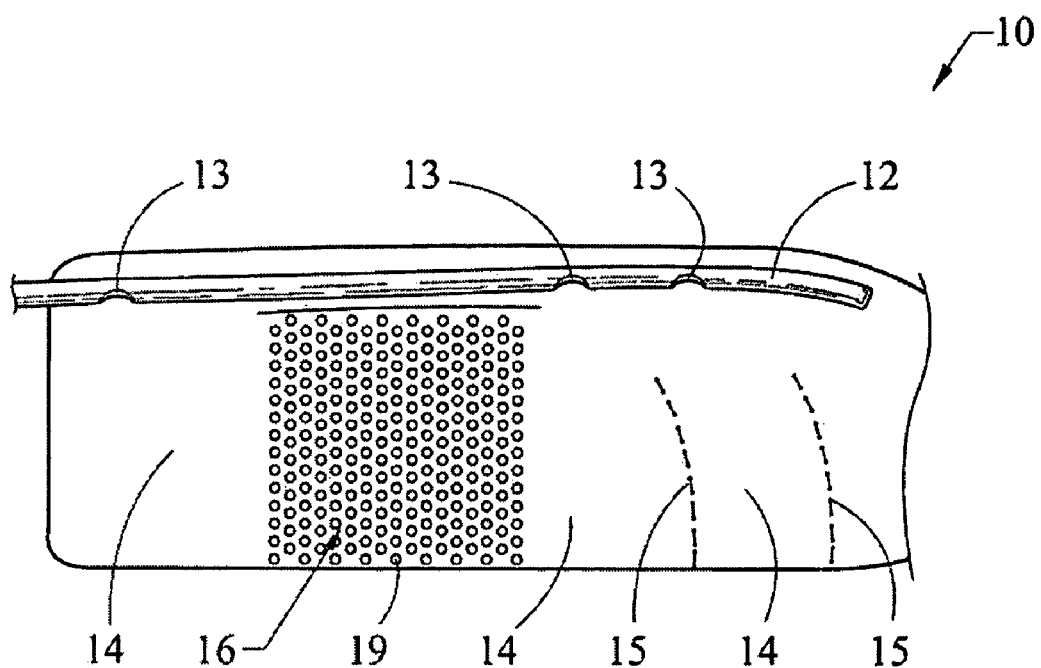

In the example of an embodiment shown in FIG. 3, a separate seal 17 is lacking: rather, the connections 19 in the pressure equalization chamber 16 are positioned in a narrow grid, in the process of which it can be seen that at the edges, that is to say toward the initially inflated primary chambers 14, the grid of the connections 19 has been further narrowed, so that at the exterior sides of the pressure equalization chamber 16 once again act as a seal.

Figure 4:
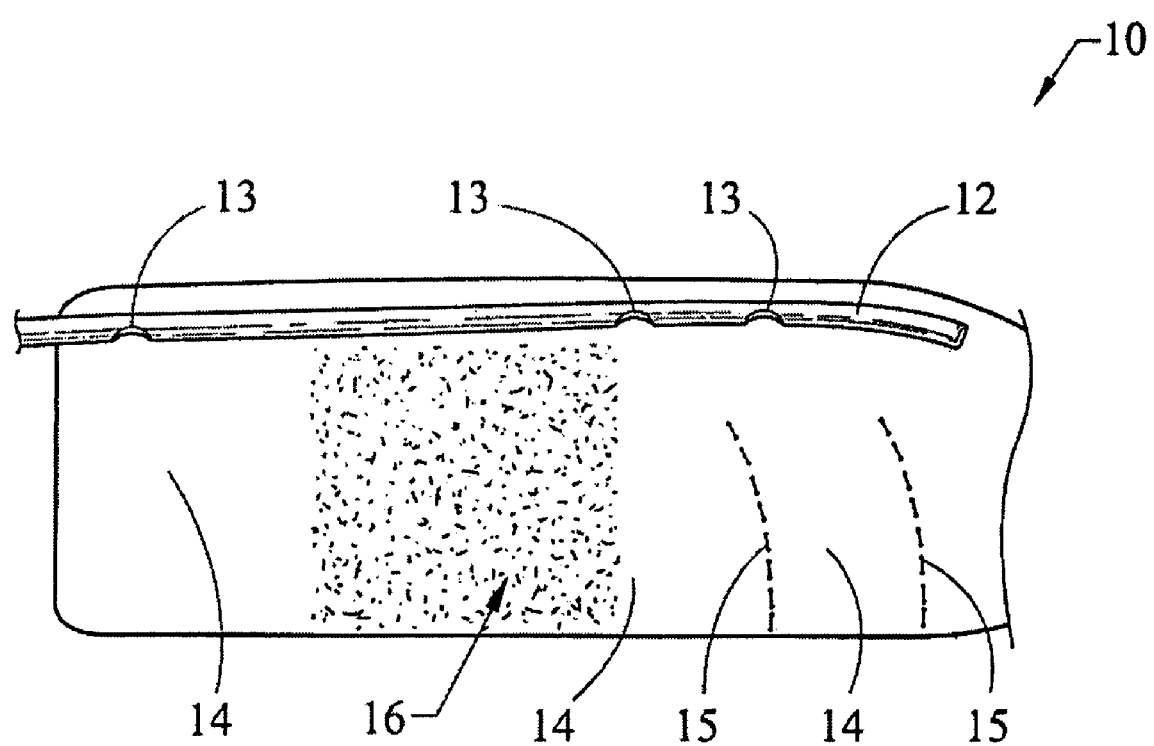

According to the example of an embodiment shown in FIG. 4 it can be seen to it that the pressure equalization chamber 16 is formed by fabric layers of the air bag 10, which fabric layers are joined over their entire surface, in the process of which the connection between the two fabric layers is dissolved to the desired degree as a function of the prevailing interior pressure, so that an appropriately variable inflation volume is made available.

The characteristics disclosed in the above description, the patent claims, the summary and the drawings of the object of these documents can be essential for the realization of the invention in its various embodiments, individually as well as in any desired combinations with each other.

The invention claimed is:

1. A side-impact protective air bag for a motor vehicle extending across at least a part of the longitudinal extent of the vehicle, the air bag comprising two layers of fabric which are joined to each other to form the air bag, the air bag adapted to be located in a region of a roof frame of the vehicle when in a folded state, and in an unfolded state the air bag forms a side-impact curtain, the air bag connected to an inflation device which releases an inflating gas, wherein the air bag contains at least one primary chamber which can be inflated directly by gas from the inflation device, the air bag further comprising at least one pressure equalization chamber formed by a connection between the fabric layers of the air bag, the fabric layers being joined to each other across their entire surface at the pressure equalization chamber, wherein after inflation of the primary chamber, as a function of the pressure acting within the primary chamber, the inflating gas enters the pressure equalization chamber and inflates at least a portion of the pressure equalization chamber by separation of the connection between the fabric layers.

2. A side-impact air bag according to claim 1, wherein the connection is fashioned as an adhesive bond between the two fabric layers of the air bag.

* * * * *